Aug. 10, 1965  H. E. McKELVEY  3,199,968
GLASS SHEET BENDING APPARATUS
Filed Aug. 14, 1959
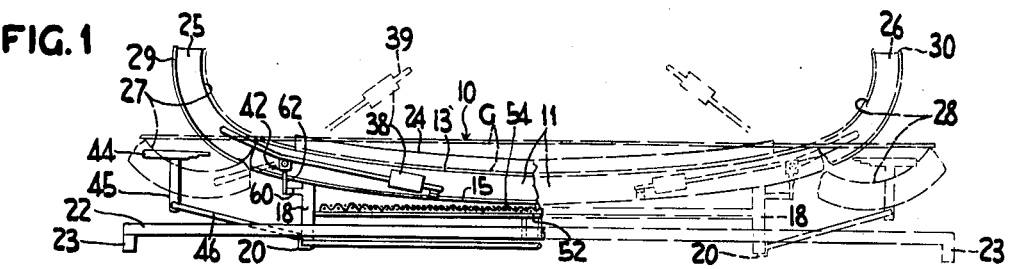
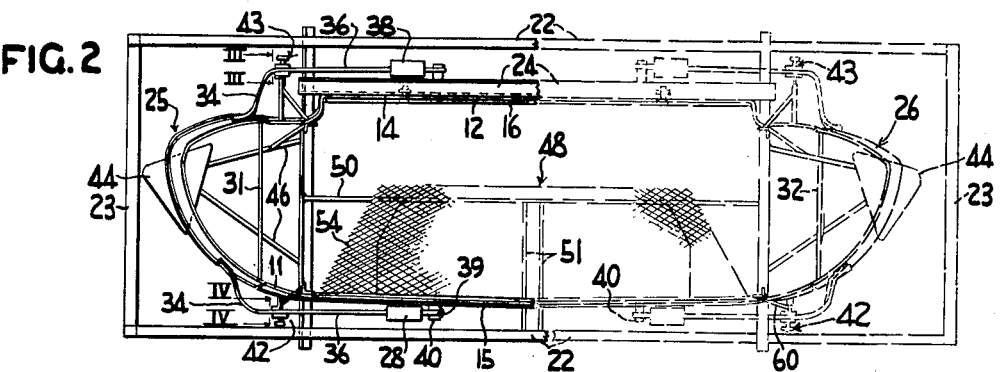
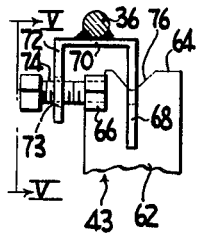
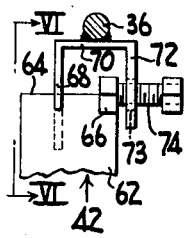
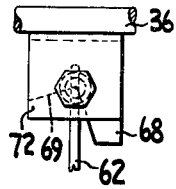
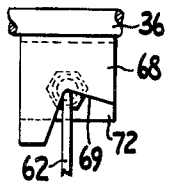
INVENTOR.
HAROLD E. McKELVEY
BY Oscar L. Spencer
ATTORNEY United States Patent Office 3,199,968
Patented Aug. 10, 1965

3,199,968
GLASS SHEET BENDING APPARATUS
Harold E. McKelvey, Cheswick, Pa., assignor to Pittsburgh Plate Glass Company, a corporation of Pennsylvania
Filed Aug. 14, 1959, Ser. No. 833,778
9 Claims. (Cl. 65—291)

The present application relates to apparatus for treating glass sheets, and particularly concerns an improvement in the construction of minimum friction bearings for sectionalized glass sheet bending molds comprising a plurality of mold members pivotally connected with respect to each other to move from a spread position for supporting flat glass sheets preparatory to bending into a closed mold position to define a substantially continuous shaping surface conforming to the ultimate shape desired for a bent glass sheet.

In United States Patent No. 2,856,734 to Ronald E. Richardson, there is disclosed and claimed a sectionalized glass bending mold having a pivotal connection between mold members comprising a knife-edge secured to one mold member cooperating with a notch formed on another mold member. Such bearing members have been very successful in improving the operating efficiency of sectionalized molds by reducing the friction of the bearings from that experienced using bearings of the stub hinge type employed in earlier bending molds. However, the angle of rotation through which the mold members could rotate relative to each other was necessarily limited by the Richardson bearing construction, because of the tendency of the Richardson knife-edge hinge to become disjointed if rotated too far from its center position.

The above limitation inherent in the Richardson knife-edge bearings made it necessary to limit their employment to molds having adjacent sections that rotated relative to each other through an acute angle. To produce "wrap-around" bends in which the longitudinal extremities are bent into planes substantially parallel with each other, it became necessary to utilize 5-section molds rather than 3-section molds employing the low friction knife-edge bearings of Richardson.

The present invention provides an improvement over the knife-edge bearing disclosed in Richardson by providing means to limit the tendency of the knife-edge bearings to become disjointed. The present invention accomplishes this by adding structure to the notched member disclosed in Richardson to form an inverted channel member comprising a web portion interconnecting a notched portion and an apertured portion. A securing element in the form of a nut is attached to the knife-edge member in alignment with an aperture in the channel member. A cooperating securing element in the form of a bolt extends loosely through the aperture of the channel member along an axis of pivoting provided by the knife-edge bearing and is attached to the nut screw-threadedly attached to the knife-edge member. The notched portion of the channel member extends across the axis of pivoting provided by the knife-edge bearing.

The novel bearing construction of the present invention enables end mold members to pivot about a complete right angle relative to a main mold member without becoming disjointed. This characteristic enables one to limit the number of mold sections required for a "wrap-around" bend to three, thus simplifying the mold construction.

The presently improved knife-edge bearing becomes a stub hinge whenever the mold members tend to become disjointed by virtue of the rotation of the knife-edge hinge beyond an amount determined by the looseness of the fit between the bolt and the aperture in the channel member. When the bolt is threaded into the nut, a stable mold construction results. The mold sections are readily removed from each other by merely unscrewing the bolts from their respective nuts.

The knife-edge members are arranged to extend in laterally opposing pairs to provide a laterally spaced pair of hinges for pivoting an end mold member relative to a main mold member. One of the knife-edge members of each pair is provided with a transverse notch which receives the notched portion of the channel member and prevents lateral displacement of one mold member with respect to its neighbor. The transverse notch in the knife-edge member extends in the direction of the axis of pivoting defined by the knife-edge members. At the same time, the notched portion of the channel member of the opposite knife-edge bearing of the pair of hinges is free to slide in case there is any difference in thermal expansion between the mold members.

Another novel feature of the embodiment illustrating the present invention which avoids disjointment of the knife-edge bearing involves the use of lever arms to pivot each end mold member relative to the main mold member. This feature involves locating the counterweights that actuate the lever arms intermediate the stops for limiting the closing movement of the lever arms and the bearings. Thus, when the lever arms contact their cooperating stop members when the mold members reach the closed mold position, the counterweights provide moments of force relative to the stop members tending to retain the knife-edge bearing in place. If the counterweights are located on the side opposite the stops from the knife-edge bearing, their moments of force about the stops would tend to lift the elements of the knife-edge bearings out of joint.

A particular embodiment of the present invention will be described for purposes of illustrating a preferred embodiment of the present invention.

In the drawings which form part of the disclosure, FIGURE 1 is a longitudinal elevation partly in phantom of a typical bending mold provided with knife-edge bearings improved according to the present invention.

FIGURE 2 is a plan view of the mold disclosed in FIGURE 1 showing the mold in the closed position.

FIGURES 3 and 4 are fragmentary sectionalized views taken along the lines III—III and IV—IV of FIGURE 2, respectively.

FIGURES 5 and 6 are sectionalized views taken along V—V of FIGURE 3 and VI—VI of FIGURE 4, respectively.

Referring to the drawings, reference number 10 refers to a main mold member provided with shaping rails 11 and 12 extending longitudinally and substantially parallel to each other to form the central portion of an outline shaped to correspond to the ultimate shape of the bent glass sheet but of slightly smaller dimensions. Shaping rail 11 has an upper shaping surface 13 and shaping rail 12, an upper shaping surface 14.

Reinforcements 15 and 16 are attached to the bottom edge of shaping rails 11 and 12 to form an inverted T construction which strengthens the rigidity of the mold rails. Adjacent each longitudinal extremity only of each shaping rail 11 and 12 a vertical post 18 is attached. Transverse rails 20 extending transversely of the mold interconnect the bottom ends of the vertical posts and help maintain the shaping rails 11 and 12 in proper spaced relation to each other. Longitudinal rails 22 interconnect the transverse rails 20 to provide a rigid mold support structure for the sectionalized bending molds.

Runner rails 23 are disposed below the remainder of the mold support structure and outboard of the longitudinal mold extremities as shown in FIGURE 1. The runner rails 23 ride on a stub roll conveyor (not shown)

to carry the mold structure transversely through a bending lehr during the glass bending operation.

An obliquely disposed slide plate 24 is secured to the mold rails by means of a series of bolts. Slide plate 24 extends longitudinally of the mold and obliquely upwardly and laterally from the shaping surface 14 of mold rail 12. Its location is preferably adjusted so that its inboard edge is spaced laterally outwardly from mold rail 12.

End mold members 25 and 26 flank the longitudinal extremities of the main mold member 10. The end mold members comprise shaping rails disposed edgewise and having upper shaping surfaces 27 and 28, respectively. Horizontally disposed reinforcements 29 and 30 are attached to the bottom edge of the shaping rails 25 and 26 in a manner similar to the method of attachment of the reinforcements 15 and 16 to shaping rails 11 and 12. Thus, shaping rails 25 and 26 are curved longitudinally to conform to an outline of slightly smaller dimensions than those of each extremity of the bent glass sheet. Their free inboard ends are interconnected for reinforcement by reinforcement rods 31 and 32, respectively.

Metal straps 34 extend laterally outwardly from the outer surface of each end mold member 25 and 26 and terminate in lever arms 36. A counterweight 38 is attached to each lever arm. Reference number 39 refers to the inboard extremity of each lever arm.

Stop members 40 are attached to the bottom of the shaping rails 11 and 12 and extend laterally outwardly to be contacted by the longitudinal extremity 39 of the lever arms 36 as they pivot with their attached end mold members 25 and 26 relative to the main mold member 10. Special knife-edge type bearings 42 and 43 are provided for this pivoting. A pair of knife-edge bearings 42 are located along one longitudinal side edge of the mold and a pair of knife-edge bearings 43 are located along the other longitudinal side edge of the mold. The construction of bearings 42 and 43 are described in detail below.

A heat absorber member 44 underlies each mold tip. The heat absorber member may be of non-uniform thickness and its bottom is connected to a vertical support rod 45 which in turn is connected by means of obliquely disposed attachment rods 46 to a portion of the mold support structure. Heat absorber members retard the heating of each tip of the glass sheet and thus keep them from curling excessively.

An additional composite heat absorber member 48 is provided to underlie one side of the central portion of the mold in the region between shaping rails 11 and 12 adjacent rail 11. The composite heat absorber member is supported on support rods 50 and 51 interconnecting portions of the mold support structure. The composite heat absorber comprises a metal plate 52 secured to the support rods 50 and 51 and a mesh screen 54 overlying metal plate 52 and extending beyond the perimeter defined by the metal plate 52. The purpose of heat absorber member is to retard the heating of one side of the central portion of the glass sheet while permitting the other side of the central portion to bend transversely about an axis extending longitudinally of the sheet.

The details of the construction of the knife-edge bearings illustrative of the present invention will now be described. A connector bar 60 secures to the mold support structure a knife-edge member 62 having an upper knife-edge surface 64, preferably coated with a long-wearing material such as Stellite, to form the knife-edge member of each knife-edge bearing 42 (FIGS. 4 and 6). Each knife-edge member 62 extends transversely of the longitudinal dimension of the mold. A securing element 66 in the form of an internally threaded nut is secured to its outer extremity laterally of the mold.

An inverted channel member having a notched portion 68 with a notch 69 is pivotally supported on the upper knife-edge surface 64 of the knife-edge member 62 with its notch 69 extending across the axis of pivoting defined by a laterally spaced pair of knife-edge bearings 42 and 43. The notched portion 68 of the channel member terminates at its upper extremity in web portion 70 that extends horizontally and laterally outwardly therefrom. An apertured portion 72 extends downwardly from the outboard extremity of web portion 70 in a plane parallel to the notched portion. Notched portion 68, web portion 70 and apertured portion 72 form an inverted channel member.

The apertured portion 72 contains an aperture 73 aligned with the nut 66 secured to the outer portion of knife-edge member 62. Aperture 73 is of a slightly larger diameter than the diameter of the thread for the nut 66. A cooperating securing element 74 in the form of a bolt extending loosely through the aperture 73 and screw-threadedly connected to nut 66 provides means for preventing the knife-edge bearing from causing the relatively pivotable molding members to become disjointed when they rotate beyond the maximum acute angle permitted by the knife-edge bearing components. Bolt 74 has a hexagonal head that is too large to fit through the aperture 73, as shown in FIG. 5.

At the longitudinally extending side of the sectionalized mold laterally opposite from the side containing the knife-edge type bearings 42, knife-edge type bearings 43 (FIGS. 3 and 5) are located. The knife-edge type bearings 43 are identical to the knife-edge type bearings 42 except that a notch 76 is provided in the upper surface 64 of knife-edge member 62.

The upper surface of each web portion 70 extending from the notched portion 68 is secured to a lever arm 36, for example, by welding, and, therefore, causes the notched portion 68 to pivot with its attached end mold member 25 or 26. The knife-edge member 62 is fixed in position relative to the central mold member 10. These attachments enable the knife edge bearings 42 and 43 to serve as stable yet substantially frictionless bearings for pivoting the end mold members 25 and 26 relative to the center main mold member 10.

The notch 76 in the knife-edge surface 64 of knife-edge bearing 43 of each pair of knife-edge bearings extends along the axis of pivoting and its lowermost portion receives the notched portion 68 of the channel member in proper lateral alignment and thus causes each mold member to be located in the proper lateral disposition with respect to its neighbor. At the same time, the notched portion 68 of the opposing bearing 42 is free to slide along the upper knife-edge surface 64 of the knife-edge member 62 of the opposite bearing to compensate for any difference in thermal expansion between the mold members. This construction reduces any tendency of the mold to become distorted at the bearings and increase the friction inhibiting relative rotation between the mold sections.

Because lateral alignment between adjacent mold sections is most critical in the region where the glass sheet is bent transversely about an axis extending longitudinally thereof, it is preferred to locate the knife-edge bearings 43 whose knife-edge member is notched along the longitudinal side edge adjacent the portion to be bent transversely about an axis extending longitudinally thereof.

Because the hinges 42 and 43 are of the knife-edge type, the location of the stop members 40 which are contacted by the rotating lever arms 36 is especially important. In earlier mold constructions employing stub hinges as bearings the counterweights 38 are located at the extreme inboard extremity of lever arms 36 and the stops 40 are located between the stub hinges and the counterweights. According to the present invention, it has been found necessary to locate the counterweights 38 between the hinge axis defined by the bearings 42 and 43 about which the end mold members 25 and 26 rotate and the stop member 40 for each of the lever arms 36 when the mold members occupy the closed mold position.

This construction avoids any tendency for the counterweight 38 to lift the entire end mold member and disengage the elements of the knife-edge bearing from each other, a possibility which would occur if the counterweight 38 were located on the opposite side of the stop member 40 from the pivot axis defined by the bearings 42 and 43. Instead, each counterweight 38 serves to provide a moment of force about stop member 40 that urges the notched portion 68 of the channel member to remain in bearing contact with the knife-edge member 62 of the knife-edge bearing 42 or 43.

The operation of the mold is as follows. A flat sheet of glass G is supported near its longitudinal extremities on the outboard longitudinal extremities of the end mold sections 25 and 26. The obliquely disposed slide plate 24 supports the flat glass sheet along one longitudinally extending side edge. The other longitudinally extending side edge of the glass sheet is supported at the longitudinal extremities of rail 11. The one longitudinally extending side edge of the flat glass may also be supported at the longitudinal extremities of rail 12.

The glass laden mold is then transported laterally through a bending lehr with the obliquely disposed slide plate 24 forming the leading side edge of the mold. The glass laden mold first traverses a preheating section, wherein the glass is subjected to a substantially uniform temperature pattern of gradually increasing intensity to cause the glass to attain an elevated temperature within its annealing range. Then the glass is subjected to a non-uniform heating pattern including regions of high intensity which are intercepted by the portions of the glass sheet to be bent most severely adjacent the hinge axes. The presence of the heat absorbers 44 inhibits the heating and curling of the tips of the glass sheet overlying the heat absorbers 44 by virtue of selective heat abstraction of the heat from the tips of the glass sheet. Also, the portion of the glass sheet above the composite heat absorber 48 is inhibited from softening by the presence of a heat absorber in its vicinity.

Since the glass sheet is supported at its periphery only, the force of the counterweights 38 tends to rotate the end mold members 25 and 26 upwardly about the hinge axes defined by the knife-edge bearings 42 and 43. The side edge of the glass sheet initially supported on the obliquely disposed slide plate 24 slides laterally and the glass sags transversely about an axis extending longitudinally of the glass sheet while the glass is also being bent longitudinally to a non-uniform curvature about an axis extending transversely of the glass sheet. Thus, the glass is bent both longitudinally and transversely to conform to the upper shaping surface provided by the upper shaping surfaces 13, 14, 27 and 28 of the shaping rails 11, 12, 25 and 26, respectively.

The provision of bearings having a minimum frictional coefficient enables the mold to close promptly in response to the softening of the glass so as to impose the longitudinal bend about the transverse axis at the proper time of the bending cycle. This result necessarily follows from the fact that the longitudinal bend about the transverse axis results from a combination of heat sagging and the application of mechanical force by virtue of the counterweights, whereas the transverse bend about the axis extending longitudinally of the glass sheet occurs by virtue of heat sagging alone.

The form of the invention shown and described in this disclosure is an illustrative preferred embodiment. It is understood that various changes may be made without departing from the spirit of the invention as defined in the following claims.

What is claimed is:

1. Apparatus for bending glass sheets comprising
  a main mold member,
  an end mold member, and
  a pivotal connection between said main mold member and said end mold member located along an axis of pivoting and comprising
    an inverted channel member secured to one of said mold members, said inverted channel member having a notch and an aperture spaced from one another in alignment along said axis of pivoting,
    a knife-edge member connected to the other said mold member and cooperating with said notch in said channel member to provide said pivotal connection,
    and means for securing said knife-edge member to said inverted channel member comprising
      a securing element attached to said knife-edge member in alignment with said aperture in said channel member and
      a cooperating securing element extending loosely through said aperture along said axis of pivoting and attached to said securing element attached to said knife-edge member.

2. A glass bending mold comprising
  a main mold member,
  an end mold member and
  a pivotal connection between the end mold member and the main mold member, said pivotal connection comprising
    a pair of laterally spaced knife-edge bearings located along an axis of pivoting, each bearing comprising
      a knife-edge member located along said axis of pivoting and fixed in position relative to said main mold member,
      an inverted channel member attached to said end mold member and having a notch to cooperate with said knife-edge member and an aperture spaced from said notch and in alignment therewith along said axis of pivoting,
      a securing element attached to said knife-edge member in alignment with said aperture of said channel member and
      a cooperating securing element extending loosely through said aperture along said axis of pivoting and attached to said securing element attached to said knife-edge member.

3. Apparatus as in claim 2, wherein the knife-edge member of one of said pair of bearings is notched in the direction of said axis of pivoting to receive its cooperating notched channel member in its notched portion.

4. A glass bending mold comprising
  a main mold member,
  end mold members flanking said main mold member,
  a knife-edge pivotal connection between each end mold member and said main mold member,
  a lever arm attached to each end mold member and extending to the side opposite the pivotal connection from that occupied by its attached end mold member,
  a stop member located along the path taken by said lever arm when the end mold member attached to said lever arm pivots relative to said main mold member to define a closed mold position when the lever arm contacts the stop member,
  and a weight secured to said lever arm between said pivotal connection and the portion of said lever arm contacting said stop member.

5. A glass bending mold comprising
  a main mold member,
  end mold members flanking said main mold member,
  a pivotal connection between each end mold member and said main mold member, each pivotal connection comprising
    a pair of laterally spaced knife-edge bearings located along an axis of pivoting, each bearing comprising a knife-edge member located along said axis of pivoting and fixed in position relative to said main mold member, an inverted channel member attached to said end mold member and having a notch to cooperate with said knife-edge member and an aperture spaced from said notch and in alignment therewith along said axis of pivoting, a securing element attached to said knife-edge member in alignment with said aperture in said channel member and a cooperating securing element extending loosely through said aperture along said axis of pivoting and attached to said securing element attached to said knife-edge member, a lever arm attached to each end mold member and extending to the side opposite the pivotal connection from that occupied by its attached end mold member, a stop member located along the path taken by said lever arm when the end mold member attached to said lever arm pivots relative to said main mold member to define a closed mold position when the lever arm contacts the stop member, and a weight secured to said lever arm between said pivotal connection and the portion of said lever arm contacting said stop member.

6. Apparatus as in claim 5, wherein the knife-edge member of one of said pair of bearings is notched in the direction of said axis of pivoting to receive its cooperating notched channel member in its notched portion.

7. A glass bending mold comprising
a main mold member,
an end mold member,
a knife-edge pivotal connection between said end mold member and said main mold member,
a lever arm attached to said end mold member and extending to the side opposite the pivotal connection from that occupied by its attached end mold member,
a stop member located along the path taken by said lever arm when the end mold member attached to said lever arm pivots relative to said main mold member to define a closed mold position when the lever arm contacts the stop member, and a weight secured to said lever arm between said pivotal connection and the portion of said lever arm contacting said stop member.

8. A glass bending mold as in claim 7, wherein said knife-edge pivotal connection comprises a pair of knife-edge members disposed in spaced relation to one another along a pivot axis extending transversely of said mold and attached to one of said mold members and a pair of notched members attached to the other of said mold members, one of said pair of notched members being pivotally supported at its notched portion on one of said pair of knife-edge members and the other of said pair of notched members being pivotally supported at its notched portion on the other of said pair of knife-edge members, one of said knife-edge members being notched, the notch of said one of said knife-edge members being along said pivot axis to receive said one of said pair of notched members for pivotal support thereabout.

9. A mold as in claim 8, wherein each of said notched members of said pair of notched members has a notched portion, and an apertured portion in spaced relation to said notched portion and aligned therewith along said axis of pivoting, said apertured portion being provided with an aperture along said pivot axis, and a securing element located along said pivot axis and attached to the outer end of each of said knife-edge members, and wherein a cooperating securing element extends loosely through said aperture and is attached to said securing element.

References Cited by the Examiner
UNITED STATES PATENTS

| | | | |
|---|---|---|---|
| 760,959 | 5/04 | Connington | 65—158 |
| 1,999,558 | 4/35 | Black | 65—289 |
| 2,241,349 | 5/41 | Hem | 308—2 |
| 2,348,279 | 5/44 | Boyles et al. | 65—288 |
| 2,500,278 | 3/50 | Dunipace | 65—160 |
| 2,611,663 | 9/52 | Foster | 308—2 |
| 2,680,564 | 6/54 | Field | 308—2 X |
| 2,689,120 | 9/54 | Reussenzehn | 308—2 X |
| 2,723,165 | 11/55 | Hess | 308—2 |
| 2,746,814 | 5/56 | Van Duyn | 308—2 |
| 2,856,734 | 10/58 | Richardson | 65—291 |
| 2,857,713 | 10/58 | Cleminson | 65—291 |
| 2,924,045 | 2/60 | Startzell | 65—288 |

DONALL H. SYLVESTER, *Primary Examiner.*

CHARLES R. HODGES, IVAN R. LADY, MORRIS O. WOLK, *Examiners.*